(12) United States Patent
Ho

(10) Patent No.: US 6,254,448 B1
(45) Date of Patent: Jul. 3, 2001

(54) APPARATUS AND METHOD FOR DETECTING A STARTING SIGNAL IN AN AUTOMATIC FACILITY

(75) Inventor: Jea-Ick Ho, Suwon (KR)

(73) Assignee: SamSung Electronics Co., Ltd., Suwon (KP)

( * ) Notice: Subject to any disclaimer, the term of this patent is extended or adjusted under 35 U.S.C. 154(b) by 0 days.

(21) Appl. No.: 09/222,763

(22) Filed: Dec. 30, 1998

(30) Foreign Application Priority Data

Dec. 30, 1997 (KR) .................................................. 97/78219

(51) Int. Cl.$^7$ .................................................. F23Q 23/08
(52) U.S. Cl. .................................................. 445/3; 445/63
(58) Field of Search .................................. 445/3, 36, 63, 445/68

(56) References Cited

U.S. PATENT DOCUMENTS

| | | | |
|---|---|---|---|
| 4,648,346 | * | 3/1987 | Miyazawa et al. .................. 118/500 |
| 6,074,262 | * | 6/2000 | Shin ......................................... 445/63 |

* cited by examiner

Primary Examiner—Kenneth J. Ramsey
Assistant Examiner—Todd Reed Hopper
(74) Attorney, Agent, or Firm—Robert E. Bushnell, Esq.

(57) ABSTRACT

Disclosed is an apparatus and a method for detecting a starting signal in an automatic facility, in which a pattern is automatically provided to a cathode-ray tube assembly on a pallet to examine and adjust the cathode-ray tube assembly. According to an aspect of the present intention, the apparatus for detecting a starting signal in an automatic facility, includes first and second stoppers that are mounted on a frame of the conveyor belt in a direction of moving the pallet and are lowered and raised by a pneumatic pressure, a detector which is disposed in place on the frame of the conveyor belt to be spaced at a predetermined distance from the first stopper, for detecting the introduction and the position of the pallet, and a controller for raising the first and second stoppers using the pneumatic pressure to stop the pallet and to prevent the introduction of a next pallet when the detector detects the introduction of the pallet, for controlling the measuring device to provide the pattern for the examination and the adjustment through the secured connector to the cathode-ray tube assembly when the detector detects the position of the pallet, and then for lowering the first and second stoppers. Accordingly, it is possible to control the first and second stoppers simultaneously, thereby preventing errors and improving a productivity of products.

20 Claims, 6 Drawing Sheets

APPARATUS AND METHOD FOR DETECTING A STARTING SIGNAL IN AN AUTOMATIC FACILITY

CLAIM OF PRIORITY

This application makes reference to, incorporates the same herein, and claims all benefits accruing under 35 U.S.C. §119 from an application entitled An Apparatus and Method for Detecting a Starting Signal in an Automatic Facility earlier filed in the Korean Industrial Property Office on Dec. 30, 1997, and there duly assigned Ser. No. 78219/1997 by that Office.

BACKGROUND OF THE INVENTION

1. Field of the Invention

The present invention relates to an automated facility, and more particularly to an apparatus and a method for detecting a start signal in an automated facility, in which an introduction and a position of a pallet which has a cathode ray tube assembly and carried by a conveyor belt can be detected so that a pattern signal is automatically provided to the cathode ray tube assembly to examine and adjust the cathode ray tube assembly.

2. Description of the Prior Art

Generally, an image displaying apparatus displays various observable image signals. The image displaying apparatus including a cathode-ray tube assembly must be examined and adjusted in an automated manufacturing facility in order to display the image signals clearly.

The examination and adjustment are continuously performed for the image displaying apparatus, such as the cathode-ray tube assembly, on a pallet carried by a conveyor belt.

As known well, in a manufacturing line for adjusting the image on the image displaying apparatus, for example the cathode-ray tube assembly by providing signals for examination and adjustment to the image displaying apparatus, the cathode-ray tube assembly is introduced into the manufacturing line while it is disposed on the pallet carried by the conveyor belt. The cathode-ray tube assembly on the pallet is positioned in place to be adjacent to a measuring device. A controller receives an introduction and a position of the cathode-ray tube assembly from a detector and makes a signal a providing device that provides various signals, for examples a horizontal synchronization signal, a vertical synchronization signal, and a data channel displaying signal, from the measuring device to the cathode-ray tube assembly. At this time, a distortion of the image and a scatter of image colors can be generated in the cathode-ray tube assembly.

A worker adjusts the image on the cathode-ray tube assembly and operates a signal providing device to stop the providing of signals for the examination and adjustment from the measuring device to the cathode-ray tube assembly. Then, the pallet having the cathode-ray tube assembly thereon is carried by the conveyor belt to a next working position.

FIG. 1 is a schematic view of an apparatus for detecting a start signal in an automated facility according to the conventional art.

A cathode-ray tube assembly is examined and adjusted relating to image displayed thereon while being carried by a conveyor belt.

A pallet 10 is disposed on the conveyor belt 11, on which the cathode-ray tube assembly 12 to be examined is disposed. When the conveyor belt 11 is driven, the pallet 10 having the cathode-ray tube assembly 12 disposed thereon is carried by the conveyor belt 11.

When the pallet 10 reaches a position at which a signal providing device is mounted beside the conveyor belt, as shown in FIG. 1, the pallet 10 passes a first stopper 15 disposed between guide rails for guiding the conveyor belt and is stopped by a second stopper 16 spaced at a predetermined distance from the first stopper 15.

As shown in FIGS. 1 and 2, the first and second stoppers 15 and 16 are raised by a controller 14. While the pallet 10 is carried to an examination area in which the signal providing device is disposed, the pallet 10 comes in contact with a first limit switch 17 mounted on one of the guide rails guiding the conveyor belt 11 to be projected upward. When the pallet 10 is contacted with the first limit switch 17, the first limit switch 17 is turned on by the pallet 10 to transfer a signal for notifying an introduction of the cathode-ray tube assembly to the controller 14.

When the introduction signal is transferred from the first limit switch 17 to the controller 14, the controller 14 generates a control signal P1 to control a first solenoid valve 19.

The first solenoid valve 19 shuts off air supplied through a pneumatic hose 20 to the first stopper 15 and discharges air through a distributor 21 from the first stopper 15 so that the first stopper 15 spaced from the first limit switch 17 at a predetermined distance is lowered for about 0.3 second.

The pallet 10 carried by the conveyor belt 11 passes the first stopper 15 within 0.3 second and comes in contact with a second limit switch 18 mounted on one of the guide rails for guiding the conveyor belt 11 to be projected upward while being stopped by the second stopper 16 disposed at a position between the guide rails.

Then, the controller 14 controls the first solenoid valve 19 to supply the air which is provided through the pneumatic hose 20 to the first stopper 15 through the first solenoid valve 19 and the distributor 21. Accordingly, the first stopper 15 is raised by air pressure again.

The second limit switch 18 spaced at a predetermined distance from the first stopper 15 is turned on when being in contact with the pallet 10 and transfers a signal with respect to a position of the pallet 10 to the controller 14.

When the controller 14 receives the position signal from the second limit switch 18, the signal providing device provides a signal for examination and adjustment to the cathode-ray tube assembly 12 on the pallet 10 carried by the conveyor belt 11.

When the pallet 10 is stopped by the second stopper 16 and the second limit switch 18 detects the position of the pallet 10, the controller 14 generates a control signal P3 to control the third solenoid valve 23.

The third solenoid valve 23 provides the air supplied through the pneumatic hose 24 to a securing device 22 secured to the frame of the conveyor belt 11 according to the control of the controller 14.

The security device 22 forces the pallet 10 to be close to the worker by the air pressure of the air supplied from the third solenoid valve 23 and secures to hold the pallet 10 stable.

Then, the controller 14 generates a control signal P2 to control the second solenoid valve 25 when the pallet 10 is stably secured to the main frame.

The second solenoid valve 25 provides a pressure generator 27 of the signal supplying device such as a cylinder mounted on the main frame with pneumatic pressure through the pneumatic hose 24 according to the control of the controller 14.

The pressure generator 27 generates the pressure using the air introduced from the second solenoid valve 25 to move and connect a movable connector 28 of the signal supplying device associated with the pressure generator 27 to a secured connector 29 mounted on the pallet 10.

Thus, the pattern signals for examination and adjustment that are generated by the measuring device 13 are transferred to a printed circuit board assembly 31 of the cathode-ray tube assembly 12 through a connection cable 30, the movable connector 28, the secured connector 29, and a signal cable 33 and displayed on the cathode-ray tube 32. Accordingly, the worker can identify and adjust the pattern displayed on the cathode-ray tube 32.

When the examination and adjustment for the cathode-ray tube 32 are completed and the worker pushes a stop switch (not shown), the controller 14 controls the second solenoid-valve 25 to make the pressure generator 27 move backward. When the pressure generator 27 is moved backward, the movable connector 28 associated with the pressure generator is moved backward to be disconnected from the secured connector 29. In addition, the controller 14 controls the third solenoid valve 23 so that the secured device 22 is moved back.

On the other hand, the controller 14 controls the first solenoid valve 19 to make the second stopper 16 to be lowered for a predetermined time, for example 0.3 second, so that the pallet 10 having the cathode ray tube assembly 12 is transferred by the conveyor belt 11 as soon as the stop switch is pushed. After 0.3 second, the controller 14 controls the first solenoid valve 19 and the distributor 21 to make the second stopper 16 to be raised to an initial position again.

As described above, the cathode-ray tube assembly on the pallet which is continuously moved by the conveyor belt is provided with the pattern signals for the examination and adjustment of the cathode-ray tube.

In the apparatus for detecting the start signal in an automatic facility, when the start signal is detected from the first limit switch on the frame of the conveyor belt near the signal supplying device, the first stopper is lowered for the 0.3 second. Then, when the signal for informing the position of the pallet is detected by the second limit switch, the signal supplying device provides the cathode-ray tube assembly with the pattern signal for the examination and adjustment of the cathode-ray tube assembly. After the test for the cathode-ray tube assembly, the second stopper is lowered for the 0.3 second and is held in the initial state.

In the apparatus for detecting the start signal in the automatic facility, however, there are problems in that it is difficult to control the first and second stoppers respectively and it is also difficult to initialize the signal supplying device when errors are generated during the movement of the pallet.

In other words, when a number of pallets are continuously moved along the conveyor belt, the first pallet is pushed by the second, the third, the fourth pallets and the like to be moved fast. In the case, the first limit switch is pushed by the next pallet and cannot detect the position of the second pallet.

As described above, the signal supplying device repeatedly detects the start signal of the first limit switch. Therefore, there is another problem in that if the signal supplying device malfunctions, much elapses for supplying the signal to the cathode-ray tube assembly. Further, there is a disadvantage in that the use of the first and second limit switches needs a large space.

SUMMARY OF THE INVENTION

The present invention has been made to overcome the above described problems of the prior art.

It is an object of the present invention to provide an apparatus and a method for detecting a start signal in an automatic facility, in which a malfunction of a detector due to a continuous movement of pallets can be prevented by controlling first and second stoppers simultaneously and a degradation of a productivity can be prevented by rapidly providing a pattern signal for examination and adjustment to a cathode ray tube assembly.

It is another object of the present invention to provide an apparatus and a method for detecting a start signal in an automatic facility, in which an introduction and a position of a pallet can be detected by using a limit switch and the pallet can be prevented from being distorted due to a connection with stoppers.

To accomplish the above object of the present invention, according to the first aspect of the present invention, there is provided a method for detecting a starting signal in an automatic facility capable of detecting a movement and a position of a pallet carried by a conveyor belt to examine and adjust a cathode-ray tube assembly, having the steps of:

lowering a first stopper and a second stopper that are mounted on a frame of the conveyor belt in a direction of moving the pallet;

detecting the introduction and the position of the pallet;

elevating the first and second stopper in the introduction of the pallet to connect a movable connector to a secured connector of the pallet in a predetermined time period, providing the pattern for the cathode-ray tube assembly through the movable connector so as to display the pattern for examining and adjusting the cathode-ray tube assembly on a display of the cathode-ray tube assembly; and separating the movable connector from the secured connector after examining the display of the cathode-ray tube assembly and lowering the first and second stoppers again.

A point at which the first and second stoppers are raised meets the following formula:

$$D=C/3, (C=A-B)$$

where A is a distance from the first stopper to the second stopper, B is a length of the pallet, C is a difference between the distance from the first stopper to the second stopper and the length of the pallet, and D is a distance between the first stopper and a point spaced by C third from the first stopper.

In the step for providing the pattern to the cathode-ray tube assembly, the pattern is provided to the cathode ray tube assembly when the pallet is positioned at a position that is spaced by a predetermined distance from the first stopper.

Alternatively, the pattern is provided to the cathode-ray tube assembly in the predetermined time period before a leading end of the pallet reaches the second stopper to be positioned at a suitable position.

According to the second aspect of the present invention, there is provided an apparatus for detecting a starting signal in an automatic facility capable of detecting an introduction and a position of a pallet which has a cathode-ray tube assembly and is carried by a conveyor belt, and providing a pattern generated by a measuring device through the movable connector and the secured connector to the cathode-ray tube assembly to examine and adjust the cathode-ray tube assembly, including:

stoppers which are mounted on a frame of the conveyor belt in a direction of moving the pallet and are lowered and raised by a pneumatic pressure, for including first and second stoppers;

a detector which is disposed in place on the frame of the conveyor belt to be spaced at a predetermined distance from the first stopper, for detecting the introduction and the position of the pallet; and a controller for rising the first and second stoppers using the pneumatic pressure to stop the pallet and to prevent the introduction of a next pallet when the detector detects the introduction of the pallet, for controlling the measuring device to provide the pattern for the examination and the adjustment through the secured connector to the cathode-ray tube assembly when the detector detects the position of the pallet, and then for lowering the first and second stoppers.

The detector is mounted in place on the frame of the conveyor belt so as to be spaced at a predetermined distance from the first stopper.

Preferably, the detector includes a limit switch mounted between the first and second stoppers on the frame of the conveyor belt to be spaced at a predetermined distance from the first stopper.

The limit switch detects a time of contacting to the leading end of the pallet carried by the conveyor belt and a time of detaching from a terminal end of the pallet to detect the introduction and the position of the pallet.

The first and second stoppers are lowered and raised by the controller under the pneumatic pressure.

In the apparatus for detecting the start signal in the automatic facility according to the first aspect of the present invention, as described above, the introduction and the position of the pallet are detected by only one limit switch to control the first and second stoppers simultaneously instead of the introduction and the position of the pallet being detected by first and second limit switch to control the first and second stoppers separately. Then, the pattern signal is provided to the cathode-ray tube assembly.

Since only the one limit switch detects the introduction and the position of the pallet which has the cathode-ray tube assembly thereon and is carried by the conveyor belt and the first and second stoppers are simultaneously controlled to be raised and lowered, it takes a short time to examine the cathode-ray tube assembly and the productivity can be improved in a manufacturing of products.

BRIEF DESCRIPTION OF THE DRAWINGS

The above object and other advantages of the present invention will become more apparent by describing in detail the preferred embodiment thereof with reference to the attached drawings, in which.

DESCRIPTION OF THE PREFERRED EMBODIMENT

Figure 1:
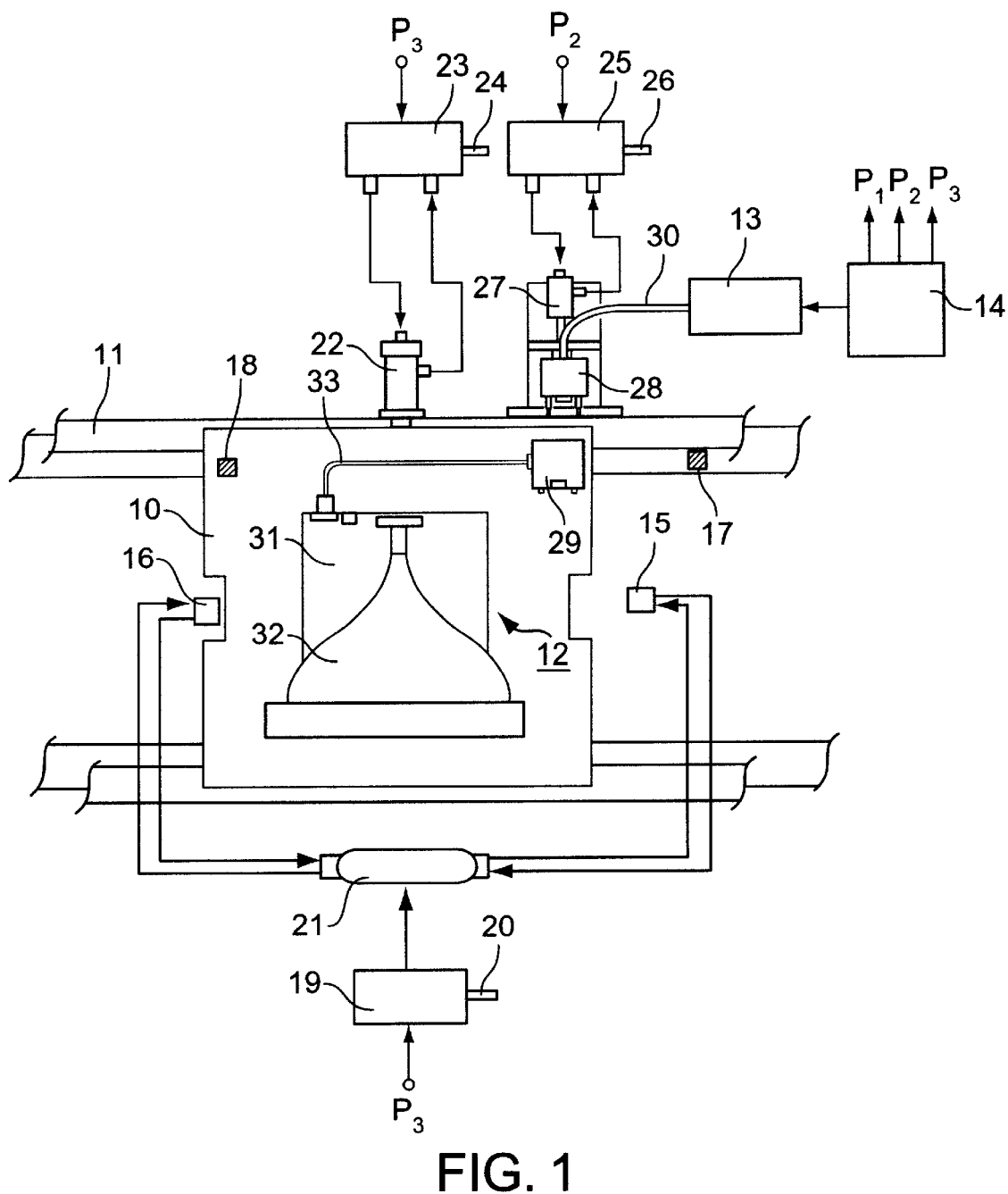
FIG. 1 is a view of a construction of an apparatus for detecting a start signal in an automatic facility according to the conventional art, in which a pattern signal is provided to a cathode-ray tube assembly to examine and adjust the cathode-ray tube assembly.
Figure 2:
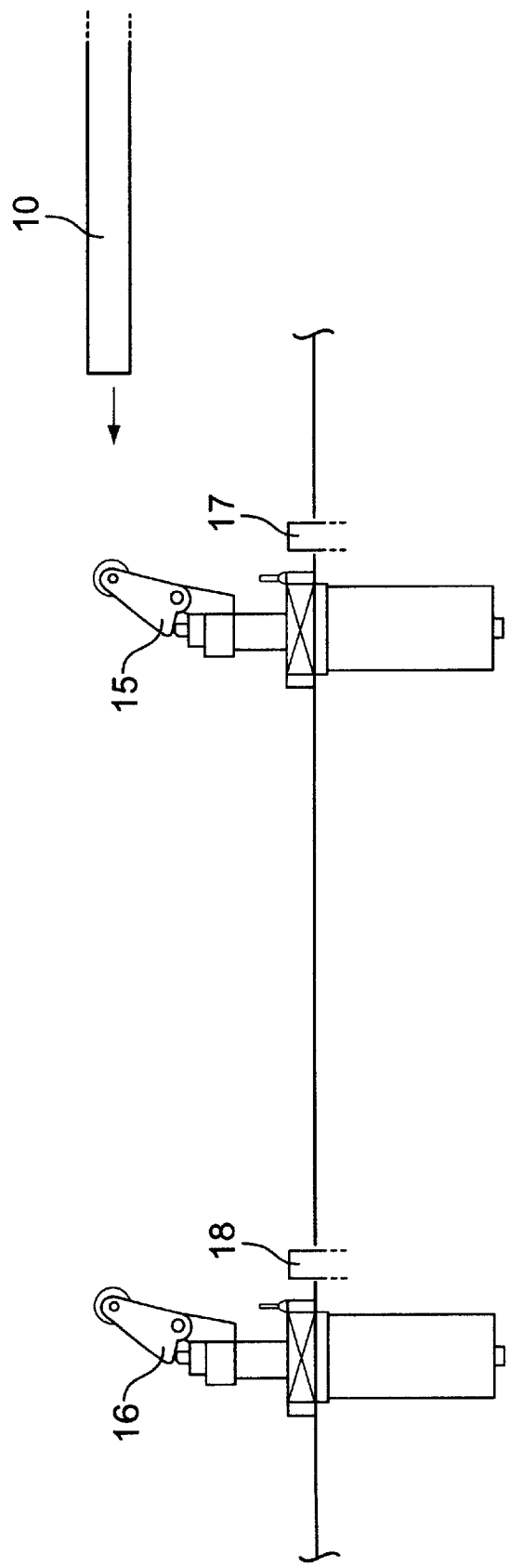
FIG. 2 is a schematic view of first and second stoppers for restraining a movement of a pallet in FIG. 1, in which the first and second stoppers are raised and lowered by a pneumatic pressure when limit switches detect an introduction and a position of the pallet.

Hereinafter, an apparatus for detecting a start signal in an automatic facility according to the present invention will be described in detail with reference to the accompanying drawings.

The apparatus for detecting the start signal according to the present invention is applied to various automatic facilities for controlling pallets moved by a conveyor belt having a product such as a color cathode-ray tube, a cathode-ray tube assembly, and a liquid crystal display respectively and for supplying the cathode-ray tube or the liquid crystal display with pattern signals for examination and adjustment thereof.

FIGS. 3 to 6 are related to the apparatus and a process for detecting the start signal in the automatic facility according to the present invention.

Like reference numerals respectively denote the same elements.

Referring to the drawings, it is understood that the apparatus for detecting the start signal is used for the conveyor belt carrying the pallets having the cathode-ray tube assembly thereon.

Figure 3:
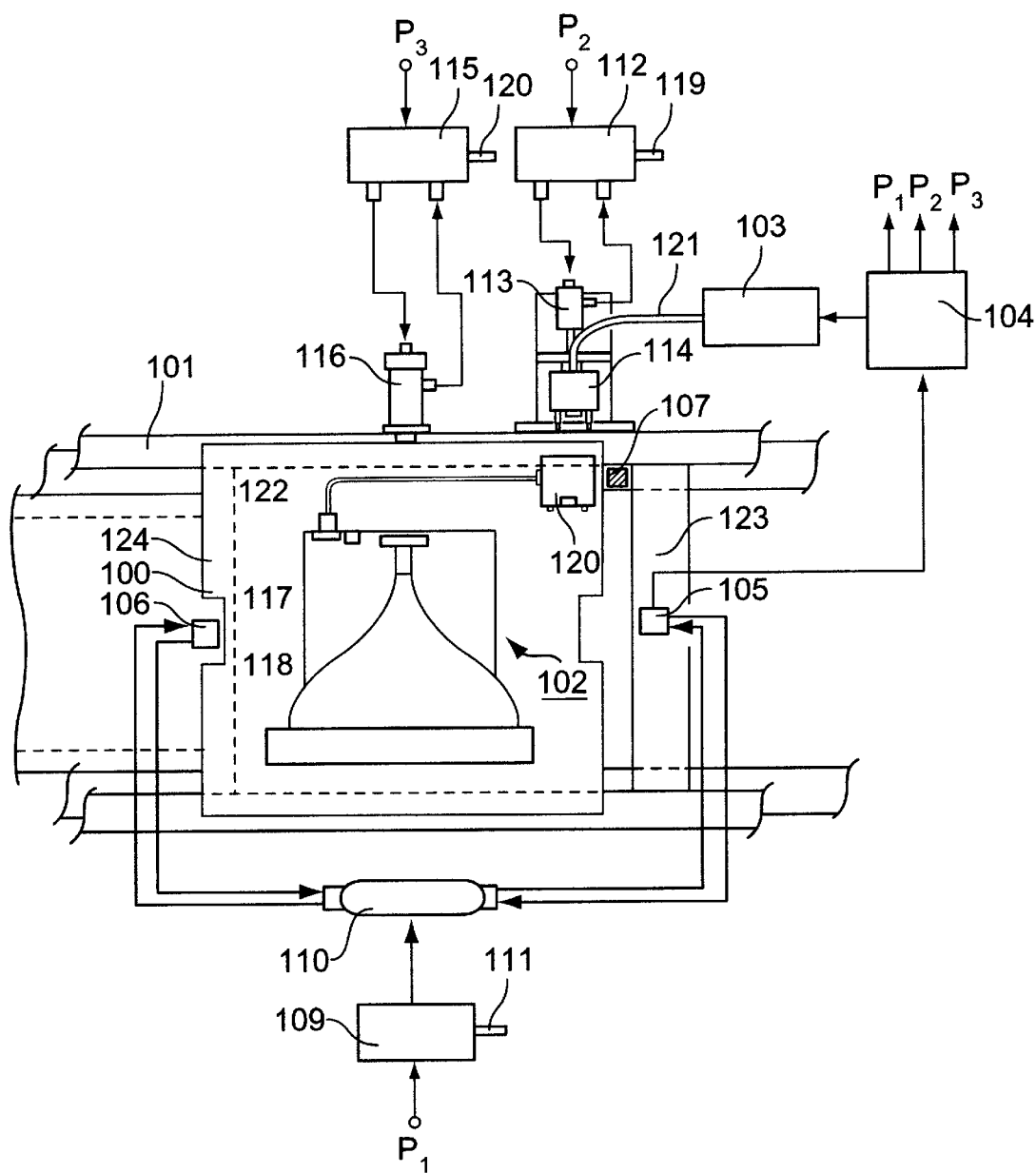
FIG. 3 is a schematic view of an apparatus for detecting a starting signal in an automatic facility according to the first aspect of the present invention, in which a pattern signal is provided to a cathode-ray tube assembly to examine and adjust the cathode-ray tube assembly.
Figure 4:
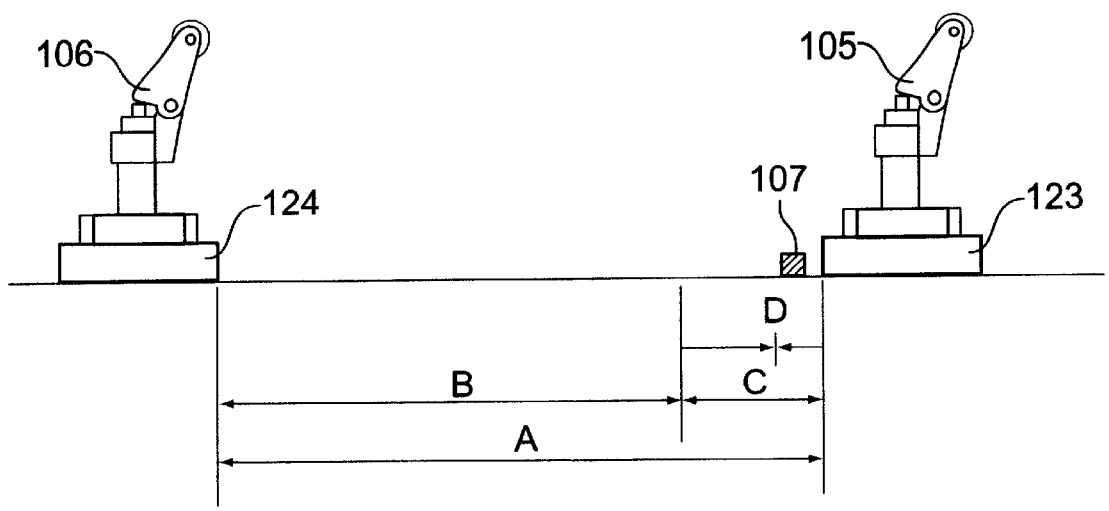
FIG. 4 is a schematic view of first and second stoppers for restraining a movement of a pallet in FIG. 3, in which the first and second stoppers are raised and lowered by a pneumatic pressure when a detector detects an introduction and a position of the pallet.

FIG. 3 is a schematic view of an apparatus for detecting a starting signal in an automatic facility according to the first aspect of the present invention, in which a pattern signal is provided to a cathode-ray tube assembly to examine and adjust the cathode-ray tube assembly. FIG. 4 is a schematic view of first and second stoppers for restraining a movement of a pallet in FIG. 3, in which the first and second stoppers are raised and lowered by a pneumatic pressure when a detector detects an introduction and a position of the pallet.

According to the present invention, as shown in FIGS. 3 and 4, the automatic facility includes a conveyor belt 101 for carrying products to be supplied with pattern signals, pallets 100 carried by the conveyor belt 101 and having a square shape in plan, a cathode-ray tube assembly 102 carried by the conveyor belt 101 with being disposed on the pallet 100, first and second sub-frames 123 and 124 extending normally to a carrying direction of the pallets 100 between frames of the conveyor belt 101, a first stopper 105 which is mounted on the first sub-frame 123 to be lowered and raised upward and downward by a pneumatic force, for preventing the movement of the pallets 100, a second stopper 106 that is mounted on the second sub-frame 124 at a predetermined distance apart from the first stopper 105 to be lowered and raised upward and downward, for stopping the movement of the pallets 100, a detector 107 which is disposed on one of the main frame of the conveyor belt 101 at a predetermined distance from the first stopper 105, for detecting the movement and the arrrival of the pallets 100, a controller 104 for controlling an entire operation of the start signal detecting apparatus, a first, second and third solenoid valve 109, 112, and 115 that are operated by the controller 104, for controlling a pressure of air flowing through pneumatic hoses 111, 119, and 120, a distributor 110 for distributing air flowing through the first solenoid valve 109 to lower and raise the first and second stopper 105 and 106, a securing device 116 which is disposed at one of the main frame of the conveyor belt 101 for pushing the pallet 100 to the other side of the main frame of the conveyor belt 101 so as to prevent the pallet 100 stopped by the pneumatic force supplied through the third solenoid valve 115 from being vibrated, a secured connector 120 which is mounted at an edge of the pallet 100 and connected through a signal cable 122 with the cathode-ray tube assembly 102 for supplying the pattern signal to a printed circuit board assembly 117 of the cathode-ray tube assembly 102 when the examination and the adjustment for the cathode-ray tube assembly 101 so that the pattern signal is displayed on the cathode-ray tube 118 is performed, a pressure generator 113 which is secured to one of the main frame of the conveyor belt 101 to be opposed to the fixed connector 120, for generating the pneumatic pressure using the air supplied through the second solenoid valve 112, a movable connector 114 which is movably combined with the pressure generator 113 at a predetermined distance from the secured connector 120 and connected with the fixed connector 120 by the pneumatic pressure of the pressure generator 113, a measuring device 103 which is electrically connected with the secured connector 114 through the connecting cable 121, for supplying the pattern signal for the examination and the adjustment to the cathode-ray tube 118 through the secured connector 120.

Figure 5:
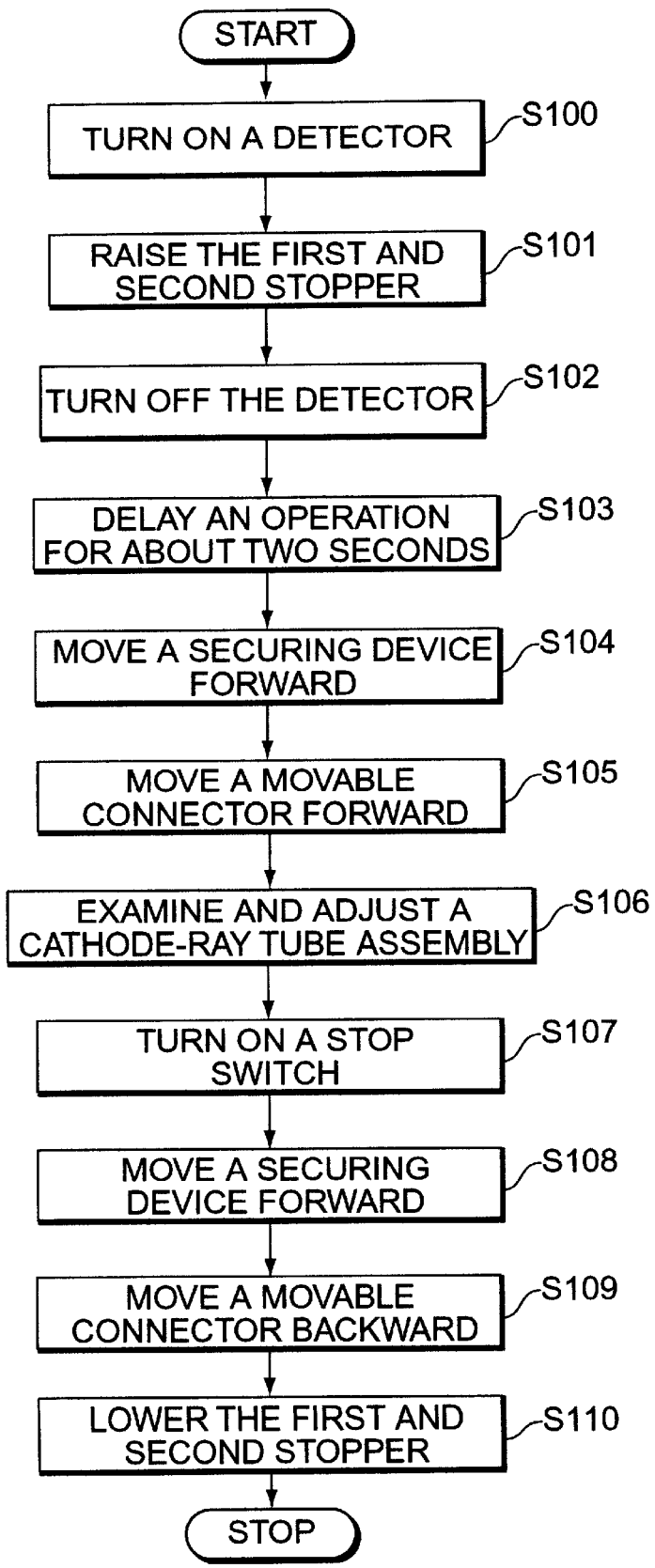
FIG. 5 is a schematic block diagram showing the apparatus for detecting the start signal in the automatic facility in FIG. 4.
Figure 6:
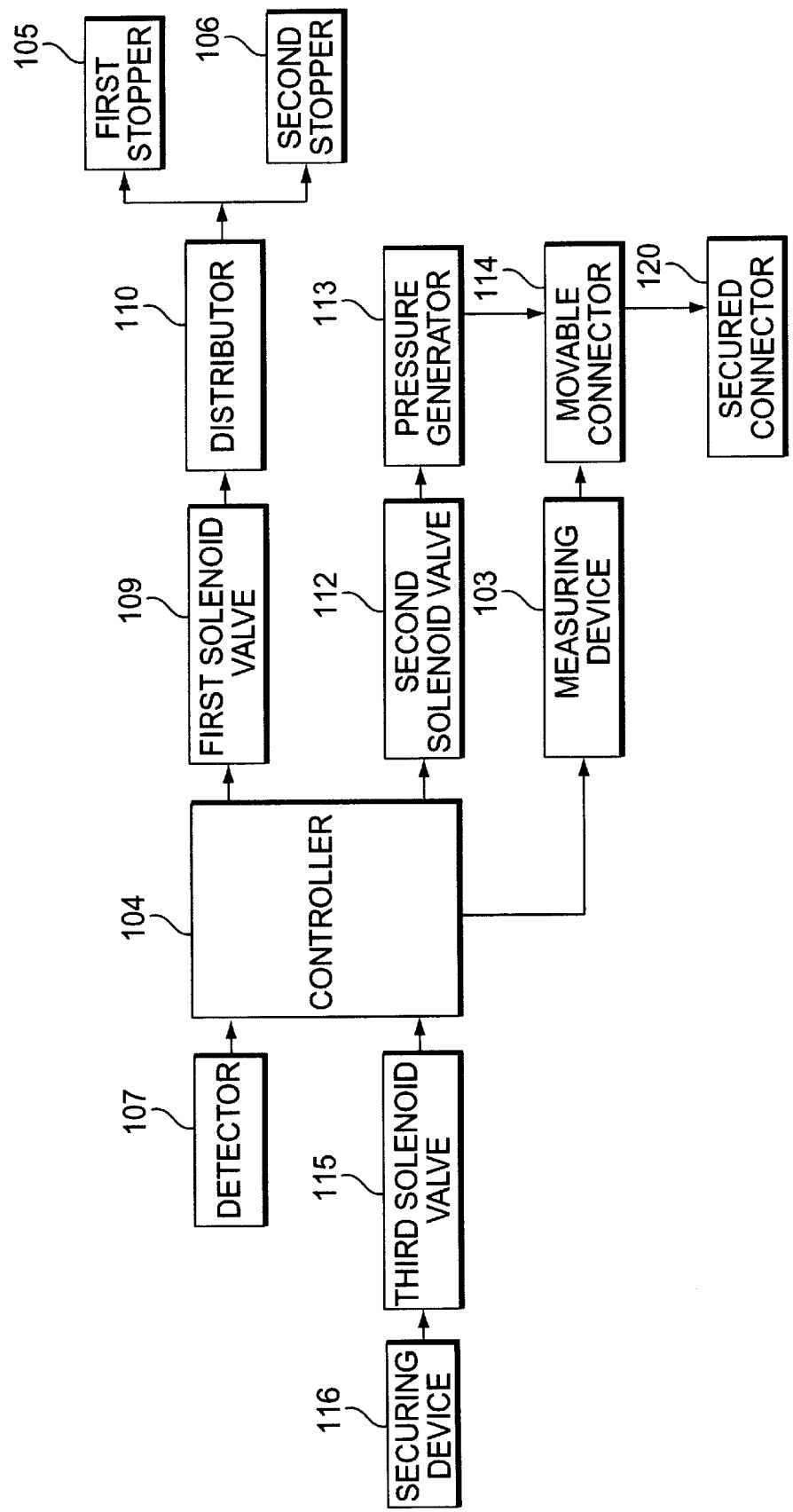
FIG. 6 is a flow chart showing a process of providing the start signal for examining and adjusting the cathode-ray tube assembly according to the second aspect of the present invention, when the introduction and the position of the pallet is detected in the automatic facility.

FIG. 5 is a schematic block diagram showing the apparatus for detecting the start signal in the automatic facility in FIG. 4. FIG. 6 is a flow chart showing a process of providing the start signal for examining and adjusting the cathode-ray tube assembly according to the second aspect of the present invention, when the introduction and the position of the pallet is detected in the automatic facility.

The apparatus for detecting the start signal in the automatic facility as constructed above supplies the pattern signal to the cathode-ray tube when detecting the movement and the position of the pallet, as follows.

Hereinafter, the operation of the apparatus for detecting the start signal according to the present invention will be described in detail with reference to FIGS. 3 to 6.

A worker mounts the pallet 100 on the conveyor belt 101 and disposes the cathode-ray tube assembly 102 to be examined and adjusted on the pallet 100. Then, when the conveyor belt 101 is operated, the cathode-ray tube assembly 102 on the pallet 100 is carried by the conveyor belt 101.

The pallet 100 is carried by the conveyor belt 101 through the first stopper 105 which is mounted on the first sub-frame 123 and lowered downward. Then, the pallet 100 is in contact with the detector 107 such as the limit switch at a position that the signal supplying device and the other worker is positioned at, as shown in FIGS. 3 and 4.

In other words, in the state that the first and second stoppers 105 and 106 are lowered down by the first solenoid valve 109 and the controller 104, the pallet 100 is carried by the conveyor belt 101 to the signal supplying device with passing the first stopper 105.

At that time, the pallet 100 passes the first stopper 105 while being in contact with and turning on the detector 107 such as the limit switch which is mounted on one of the main frame of the conveyor belt 101 to be spaced at a predetermined distance D apart from the first stopper 105, in a step S100.

It is understood that a mounting position of the detector 107 is very important.

The detector 107 is mounted on the main frame of the conveyor belt 101 at a position spaced at the predetermined distance D, for example D=C/3 (C=A−B), apart from the first stopper 105 between the first and second stoppers 105 and 106 as shown in FIG. 4, where A is a distance between the first stopper 105 which is mounted on the first sub-frame 123 and the second stopper 106 which is mounted on the second sub-frame 124, B is a length of the pallet 100, and C is a difference of the length B of the pallet 100 from the distance A between the first and second-stoppers 105 and 106.

When the detector 107 is in contact with the pallet 100 to be turned on by the pallet 100, the controller 104 generates a control signal P1 to-control the first solenoid valve 109.

The first solenoid valve 109 supplies the air through the pneumatic hose 111 to the distributor 110 so that the first and second stopper 105 and 106 are simultaneously raised, in a step S101.

Accordingly, the first stopper 105 prevents the next pallet from being continuously carried by the conveyor belt 101. As a result, errors due to the movement of the pallets can be prevented from being generated.

The detector 107 is turned off and informs the controller 104 that the pallet 100 has passed the detector 104 as the pallet 100 is moved by the conveyor belt 101 while passing the detector 107, in a step S102.

When the controller 104 receives an off signal from the detector 104, the controller 104 determines that the pallet 100 is positioned at a position that the cathode-ray tube is examined and adjusted and counts a predetermined time, for example 1.3 seconds, in a step S103.

It is noted that it takes 1.3 second for the pallet 100 to arrive to the second stopper 105 after passing the detector 107.

Therefore, the pallet 100 carried by the conveyor belt 101 passes the detector 107 and then after 1.3 seconds, the pallet 100 arrives to the second stopper 16.

That is, when the pallet 100 arrives to the second stopper 106, the detector 107 is turned off by the pallet 100.

Continuously, when it takes the predetermined time, for example 1.3 seconds, after the pallet 100 passes the first stopper 105, the controller 104 generates a control signal P3 to control the third solenoid valve 115.

The third solenoid valve 115 supplies the air through the pneumatic hose 120 to the securing device 116 such as a cylinder which is attached to the main frame of the conveyor belt 101.

The securing device 116 is moved forward by the pneumatic force of the air supplied through the third solenoid valve 115 to push the pallet 100 toward the worker and to make the pallet 100 be in close contact with the other frame of the conveyor belt 101, thereby preventing the pallet 100 from being vibrated, in a step S104.

As described above, when the pallet 100 is in close contact with the other frame of the conveyor belt 101 by the securing device 116 such as the cylinder without the vibration, the controller 104 generates the control signal P2 to control the second solenoid valve 112.

The second solenoid valve 112 supplies the air through the pneumatic hose 119 to the pressure generator 113 such as a cylinder which is mounted on the main frame of the conveyor belt 101.

The pressure generator 113 generates the pressure using the air supplied through the second solenoid valve 112 to make the movable connector 114 of the signal supplying device move to and be in electric contact with the secured connector 120 mounted on the pallet 100, in a step S105.

Then, the controller 104 controls the measuring device 103 to generate the pattern signal for the examination and the adjustment of the cathode-ray tube.

The pattern signal for the examination and adjustment of the cathode-ray tube is transferred to the printed circuit board assembly 117 of the cathode-ray tube assembly 102 through the connection cable 121, the movable connector 114, the secured connector 120, and the signal cable 122 and displayed on the cathode-ray tube 32. Then, the worker identifies the pattern signal his or her with eyes to perform the examination and the adjustment for the cathode-ray tube 32, in a step S106.

When the examination and the adjustment for the cathode-ray tube 32 is completed, the worker pushes the stop switch (not shown), in a step S107. Then, the controller 104 controls the second solenoid valve 112 to move the pressure generator 113 backward. When the pressure generator 113 is moved backward, the movable connector 114 is moved backward together with the pressure generator 113 to be disconnected from the secured connector 120 of the pallet 100, in a step S108.

Then, the controller 104 controls the third solenoid valve 115 to move the securing device 116 backward, in a step S109.

As described above, the controller 104 controls the first solenoid valve 109 to lower the first and second stoppers 105 and 106 after moving the movable connector 114 and the securing device 116 in sequence so that the first and second stoppers 105 and 106 are present in an initial state.

On the other hand, when the-second stopper 106 is lowered, the pallet 100 having the cathode-ray tube assembly 102 thereon is carried by the conveyor belt 101 to the next working position.

As described above, the pallets are continuously carried by the conveyor belt and the cathode-ray tube assembly on, the pallet is examined and adjusted by supplying the pattern signal to the cathode-ray tube.

It is understood that the apparatus for detecting the start signal according to the present invention detects the movement and position of the pallet by the detector such as the limit switch and controls the first and second stoppers simultaneously, differently from the prior art in that the movement and position of the pallet are detected by the first and second limit switches and then the first and second stoppers are separately controlled.

According to the present invention, the apparatus for detecting the start signal detects the movement and position of the pallet having the cathode-ray tube assembly so as to supply the pattern signal to the cathode-ray tube assembly and controls the first and second stoppers. Thereby, a time delay according to the separate controlling of the first and second stoppers of the prior art can be reduced, resulting in that a productivity of the cathode-ray tube assembly is improved.

Furthermore, there is an advantage in that since the apparatus for detecting the start signal detects the movement and position of the pallet using only one limit switch, an efficiency degradation of the apparatus for detecting the start signal due to the lowering and raising of the stoppers can be minimized.

While the present invention has been particularly shown and described with reference to a particular embodiment thereof, it will be understood by those skilled in the art that various changes in form and detail may be affected therein without departing from the scope of the invention as defined by the appended claims.

What is claimed is:

1. A method for detecting a starting signal in an automatic facility capable of detecting an introduction and a position of a pallet carried by a conveyor belt to examine and adjust a cathode-ray tube assembly, comprising the steps of:

lowering a first stopper and a second stopper mounted on a frame of the conveyor belt;

detecting the introduction and the position of the pallet;

elevating the first and second stopper in the introduction of the pallet to connect a movable connector to a secured connector of the pallet in a predetermined time period;

providing a pattern for the cathode-ray tube assembly through the movable connector so as to display the pattern for examining and adjusting the cathode-ray tube assembly on a display of the cathode-ray tube assembly; and separating the movable connector from the secured connector after examining the display of the cathode-ray tube assembly and lowering the first and second stoppers again.

2. A method for detecting a starting signal in an automatic facility as claimed in claim 1, with a point being where the first and second stoppers are raised meets a following formula:

$$D=C/3, (C=A-B)$$

where the A being a distance from the first stopper to the second stopper, the B being a length of the pallet, the C being a distance difference between the distance from the first stopper to the second stopper and the length of the pallet, and the D being a distance between the first stopper and the point spaced by a third of the distance of C from the first stopper.

3. A method for detecting a starting signal in an automatic facility as claimed in claim 1, with the predetermined time period being about 2 seconds after a rear end of the pallet passes the first stopper and reaches at the point.

4. A method for detecting a starting signal in an automatic facility as claimed in claim 1, with the step for providing the pattern to the cathode-ray tube assembly, the pattern being provided to the cathode-ray tube assembly when the pallet is positioned at a position spaced by a predetermined distance from the first stopper.

5. A method for detecting a starting signal in an automatic facility as claimed in claim 1, with the step for providing the pattern to the cathode-ray tube assembly, the pattern being provided to the cathode-ray tube assembly in the predetermined time period before a leading end of the pallet reaches to the second stopper to be positioned at a suitable position.

6. An apparatus for detecting a starting signal in an automatic facility capable of detecting an introduction and a position of a pallet having a cathode-ray tube assembly and is carried by a conveyor belt, and providing a pattern generated by a measuring device through a movable connector and a secured connector to the cathode-ray tube assembly to examine and adjust the cathode-ray tube assembly, comprising:

stoppers being mounted on a frame of the conveyor belt in a direction of moving the pallet and are lowered and raised by a pneumatic pressure, the stoppers including first and second stoppers;

a detector being disposed in place on the frame of the conveyor belt to be spaced at a predetermined distance from the first stopper, the detector detecting the introduction and the position of the pallet; and a controller raising the first and second stoppers using the pneumatic pressure to stop the pallet and to prevent the introduction of a next pallet when the detector detects the introduction of the pallet, the controller controlling the measuring device to provide the pattern for the examination and the adjustment through the secured connector to the cathode-ray tube assembly when the detector detects the position of the pallet, and then for lowering the first and second stoppers.

7. An apparatus for detecting a starting signal in an automatic facility as claimed in claim 6, with the detector being mounted in place on the frame of the conveyor belt so as to be spaced at a predetermined distance from the first stopper.

8. An apparatus for detecting a starting signal in an automatic facility as claimed in claim 6, with the detector being positioned at a point spaced a distance D from the first stopper, the distance D being calculated by a following formula:

$$D=C/3, (C=A-B)$$

where the A being a distance from the first stopper to the second stopper, the B being a length of the pallet, the C being a distance difference between the distance from the first stopper to the second stopper and the length of the pallet, and the D being a distance between the first stopper and a point spaced by C third from the first stopper.

9. An apparatus for detecting a starting signal in an automatic facility as claimed in claim 6, with the detector including a limit switch mounted between the first and second stoppers on the frame of the conveyor belt to be spaced at a predetermined distance from the first stopper.

10. An apparatus for detecting a starting signal in an automatic facility as claimed in claim 6, with the first and second stoppers being lowered and raised by the controller using the pneumatic pressure.

11. An apparatus for detecting a starting signal in an automatic facility as claimed in claim 6, with the raising of the first and second stoppers in the introduction of the pallet to connect the movable connector to the secured connector of the pallet being in a predetermined time period the predetermined time period being about two seconds.

12. A method for detecting a starting signal in an automatic facility as claimed in claim 2, with the predetermined time period being about 2 seconds after a rear end of the pallet passes the first stopper and reaches at the point.

13. A method for detecting a starting signal in an automatic facility as claimed in claim 2, with the step for providing the pattern to the cathode-ray tube assembly, the pattern being provided to the cathode ray tube assembly when the pallet is positioned at a position spaced by a predetermined distance from the first stopper.

14. A method, comprising:

setting an initial position of a first stopper and a second stopper, the first stopper and second stopper being mounted on a frame of a conveyor belt;

detecting automatically an introduction of and a position of a pallet on the conveyor belt;

adjusting the position of the first and second stoppers in the introduction of the pallet to connect a movable connector to a secured connector of the pallet in a predetermined period;

providing a pattern for a cathode-ray tube assembly through the movable connector as to display the pattern for examining and adjusting the cathode-ray tube; and separating the movable connector from the secured connector after examining the display of the cathode-ray tube assemble and resetting the first and second stoppers to the initial position.

15. The method of claim 14, with the first and second stoppers being adjusted at a certain point, the certain point being a third of a set distance from the first stopper, the set distance being the difference between the distance from the first stopper to the second stopper and a length of the pallet.

16. The method of claim 15, with the predetermined time period being about 2 seconds after a rear end of the pallet passes the first stopper and reaches at the certain point.

17. The method of claim 16, with the providing of the pattern to the cathode-ray tube assembly, the pattern being provided to the cathode ray tube assembly when the pallet is positioned at a position spaced by a predetermined distance from the first stopper.

18. The method of claim 17, with the adjusting of the first and second stoppers being an elevation of the first and second stoppers.

19. The method of claim 17, with the setting of the initial position being a lowering of the first and second stoppers.

20. The method of claim 14, with the step for providing the pattern to the cathode-ray tube assembly, the pattern being provided to the cathode-ray tube assembly in the predetermined time period before a leading end of the pallet reaches to the second stopper to be positioned at a suitable position.

\* \* \* \* \*